United States Patent [19]
Sommerfeld et al.

[11] 3,840,396
[45] Oct. 8, 1974

[54] PACKAGING
[75] Inventors: Dieter Sommerfeld, Monheim-Baumberg; Bernhard Kowald, Opladen-Lutzenkirchen, both of Germany
[73] Assignee: Henkel & Cie GmbH,, Dusseldorf-Holthausen, Germany
[22] Filed: June 28, 1972
[21] Appl. No.: 267,023

[30] Foreign Application Priority Data
July 3, 1971 Germany............................ 2133163

[52] U.S. Cl.... 117/155 R, 117/119.6, 117/155 UA, 117/154, 2,976,182/03001961
[51] Int. Cl............................................. D21h 1/40
[58] Field of Search............ 117/63, 155 UA, 155 R, 117/161 KP, 161 UF, 161 UC, 161 UH, 135.5, 119.6, 154; 260/2.5 AJ, 2.5 AY; 264/41, 49

[56] References Cited
UNITED STATES PATENTS
2,976,182  3/1961   Caldwell et al. ................. 117/135.5
3,379,658  4/1968   Kemper ................................ 260/2.5
3,484,273  12/1969  Kawase et al. ........................ 117/63
3,486,968  12/1969  Mater ............................... 117/63 X
3,717,597  2/1973   Hesslcamp et al. ............ 260/2.5 AJ Primary Examiner—William D. Martin
Assistant Examiner—M. R. Lusignan
Attorney, Agent, or Firm—Hammond & Littell

[57] ABSTRACT

A process for manufacturing heat-sealable packaging materials which are permeable to air, from a paper, cardboard, pasteboard, or corrugated cardboard base material comprising the steps of applying to the said base material an organic solvent solution consisting essentially of (1) from 10 percent to 50 percent by weight based upon the total solution weight of a thermoplastic material, (2) from 10 percent to 80 percent by weight based upon the weight of solid matter in the solution of an organic low molecular weight acicularly crystallizable compound having a melting point in excess of 130°C and at least 30°C in excess of the activation temperature for sealing purposes of the thermoplastic material, (3) from 0 percent to 20 percent by weight based upon the total solution weight of auxiliary substances, and (4) from 20 percent to 85 percent by weight based upon the total solution weight of an organic solvent, and evaporating the solvent from the solution to form a coating on the base material containing acicular crystals of the low molecular weight compound.

7 Claims, No Drawings

PACKAGING

PRIOR ART

It is known to render papers, cardboards, or the like, heat-sealable by coating them with solutions or dispersions of thermoplastic materials. However, such coatings substantially destroy, or even completely destroy, the permeability of the base material to air. Permeability to air is a prerequisite for many packaging applications.

In order to restore the permeability of the coated materials to air, the coated materials have to be subsequently perforated or the coating agent must be applied only in a strip-like or punctiform manner. Furthermore, when manufacturing heat-sealable materials, it is known to use a coating comprising a plastic material dispersion containing two thermoplastic materials whose fusion points differ by at least 40° C.

However, the first two above-mentioned processes require additional measures. The last-mentioned process can only be performed with aqueous dispersions; and the use of aqueous dispersions requires a long period of drying and cannot be used by manufacturers who have only lacquering machines at their disposal.

OBJECTS OF THE INVENTION

It is an object of the present invention to provide a process for manufacturing heat-sealable packaging materials which are permeable to air.

It is another object of the present invention to provide a process for manufacturing heat-sealable packaging materials which are permeable to air, from a paper, cardboard, pasteboard, or corrugated cardboard base material comprising the steps of applying to the said base material an organic solvent solution consisting essentially of (1) from 10 percent to 50 percent by weight based upon the total solution weight of a thermoplastic material, (2) from 10 percent to 80 percent by weight based upon the weight of solid matter in the solution of an organic low molecular weight acicularly crystallizable compound having a melting point in excess of 130°C and at least 30°C in excess of the activation temperature for sealing purposes of the thermoplastic material, (3) from 0 percent to 20 percent by weight based upon the total solution weight of auxiliary substances, and (4) from 20 percent to 85 percent by weight based upon the total solution weight of an organic solvent; and evaporating the solvent from the solution to form a coating on the base material containing acicular crystals of the low molecular weight compound.

These and other objects of the invention will become apparent as the description thereof proceeds.

DESCRIPTION OF THE INVENTION

The present invention is directed to a process for manufacturing heat-sealable packaging materials which are permeable to air, from a paper, cardboard, pasteboard, or corrugated cardboard base material comprising the steps of applying to the said base material an organic solvent solution consisting essentially of (1) from 10 percent to 50 percent by weight based upon the total solution weight of a thermoplastic material, (2) from 10 percent to 80 percent by weight based upon the weight of solid matter in the solution of an organic low molecular weight acicularly crystallizable compound having a melting point in excess of 130°C and at least 30°C in excess of the activation temperature for sealing purposes of the thermoplastic material, (3) from 0 percent to 20 percent by weight based upon the total solution weight of auxiliary substances, and (4) from 20 percent to 85 percent by weight based upon the total solution weight of an organic solvent; and evaporating the solvent from the solution to form a coating on the base material containing acicular crystals of the low molecular weight compound.

Examples of suitable thermoplastic materials include polyurethane, polyvinyl acetate and copolymers of vinyl acetate with ethylene, polyvinylchloride, copolymers of vinyl chloride with vinyl propionate or vinylidene chloride or acrylic acid esters, copolymers of various methacrylic acid esters with acrylic acid esters, copolymers of butadiene and acrylonitrile, polychloroprene.

In order to produce the coating solution, the thermoplastic materials are dissolved in an organic solvent such as acetone, ethyl acetate, methylethyl ketone, trichloroethylene, carbon tetrachloride, methylene chloride, or dimethyl sulphoxide, and the mixtures thereof, with the optional additon of a low-boiling alcohol such as ethanol or isopropanol. Sufficient solvent should be used to produce an approximately 10 percent to 50 percent by weight solution of the thermoplastic material based upon total weight.

Advantageously, the acicularly crystallizable, low molecular weight compound is added to this solution in such a quantity that it is present in an amount of from 10 percent to 80 percent by weight, preferably 15 percent to 45 percent by weight based upon the solid matter present in the solution. Examples of suitable acicularly crystallizable, low molecular weight compounds are urea, phthalic acid anhydride, hydroquinone, or succinic acid and the mixtures thereof.

The acicularly crystallizable compounds should, if possible, be completely dissolved in the organic solvents. If complete solubility is not possible, then the compounds should at least be present in a uniformly distributed form, so that the suspension can be readily applied to the base material without separation, and to give a uniform application thereof. However, it is preferred that the acicularly crystallizable compound be fully dissolved in the organic solvents used.

Furthermore, in a known manner, the coating solutions may contain from 0 percent to 20 percent by weight based upon the total weight of auxiliary substances such as low molecular or polymeric plasticizers, dyes, pigments, stabilizers and antioxidants.

The coating solution is then applied in such a manner that from about 5 g to 120 g, particularly from 15 g to 50 g of solid substance is allotted per square meter of base material. Preferably, the packaging materials are coated onto the substrate using conventional lacquering machines.

The weight of the base papers or of the cardboards or pasteboards usually range from about 80 g/m² to about 500 g/m².

The sealing temperature of the thermoplastic material or that of the coating containing the further auxiliary substances may vary within relatively wide limits and may range from about 70°C to 150°C. Advantageously, the sealing of the coated packaging materials, carried out for example during the manufacture of blister packages, is effected using infrared radiation or hot air The solvent or solvent mixture should evaporate at a temperature below the activation temperature of the thermoplastic. Preferably the solvent or solvent mixture should evaporate at a temperature below 150°C.

It is a new and unexpected result of the present invention that the low molecular weight, acicularly crystallizing compounds of the present invention cause the coatings to have a good air permeability, in spite of the presence of other solid substances, such as pigments and crystallizing plasticizers which may be present in this solution and which do not produce this result.

The following examples are merely illustrative of the present invention without being deemed limitative in any manner thereof.

EXAMPLE 1

150 g of a thermoplastic polyurethane, having a molecular weight of about 180,000 were produced by reacting a polyol of adipic acid and diethylene glycol with diphenylmethane diisocyanate. The 150 g of the thermoplastic polyurethane reaction product were dissolved in a mixture of 400 g ethyl acetate and 400 g methylethyl ketone. 20 g phthalic acid anhydride were added and completely dissolved therein.

This solution was applied to samples of cardboard having a weight of 350 g/m² by means of a lacquer applicator, such as a doctor blade. Then the solvent was evaporated from the solution to form a coating on the cardboard containing acicular crystals of the low molecular weight compound. The applied coating was heated to its activation temperature for sealing purposes of about 70°C. In one instance enough solution was utilized to produce an air-permeable packaging weighing 15 g/m². In a second instance the packaging weighed 30 g/m².

In order to determine the permeability of the cardboard to air, the following test was conducted:

A vessel (I) having a capacity of 1 liter, fitted with a conventional mercury laboratory manometer, was connected to a further vessel (II) which could be set to a constant pressure of 30 mm. A piece of cardboard having a cross sectional area of 25 cm² was inserted into the tubular member connecting the two vessels. After setting the pressure in vessel II to a constant pressure of 30 mm, the pressure in vessel I which was established after 2 minutes was measured in vessel I for the case of a noncoated cardboard and for the case of a cardboard having a coating of 15 g/m² or of 30 g/m² Also, the pressure established after 5 minutes was measured.

For the purpose of comparison, those pressure values were determined which were established for a coating of 15 g/m² or 30 g/m² using a control solution which did not contain phthalic acid anhydride. In this comparative experiment, the mercury manometer used still did not show any pressure change in vessel I after 2 minutes.

In the following table the time is given in minutes in the first column, followed by the pressure values in mm which were established with the following samples:
a. the cardboard without a coating
b. the cardboard having a coating in accordance with the invention, and
c. the cardboard without the additive in accordance with the invention (comparative experiment).

TABLE

| Time in minutes | a) without any coating | b) Coating in accordance with the invention 15 g/m² | 30 g/m² | c) Comparative experiment 15 g/m² | 30 g/m² |
| --- | --- | --- | --- | --- | --- |
| 2 | 45 mm | 47 mm | 58 mm | >140 mm | >140 mm |
| 5 | 40 mm | 42 mm | 48 mm | 123 mm | 126 mm |

EXAMPLE 2

A solution was prepared by dissolving 70 g of a butadiene-acrylonitrile rubber, having an average content of acrylonitrile of 30 percent by weight, and 100 g of a co-polymer of 85 parts by weight of polyvinylchloride and 15 parts by weight of polyvinylacetate (K-value 50) in a mixture of 250 g acetone, 150 g methylethyl ketone, 250 g acetic acid and 150 g methylene chloride. Then 20 g phthalic acid anhydride were added to this solution; and, secondly, 50 g hydroquinone were added to the solution.

This solution was applied to cardboard samples weighing 500 g/m² and to paper samples weighing 80 g/m². Then the solvent was evaporated from the solution to form a coating on the substrate. The applied coating was heated to its activation temperature for sealing purposes of about 90°C. The cardboard samples each had a coating layer weighing 20 g/m², while the paper samples each had a coating layer weighing 40 g/m².

The coated cardboards or pasteboards were used to manufacture blister packages using infra-red heating.

Although the present invention has been disclosed in connection with a few preferred embodiments thereof, variations and modifications may be restored to by those skilled in the art without departing from the principles of the new invention. All of these variations and modifications are considered to be within the true spirit and scope of the present invention as disclosed in the foregoing description and defined by the appended claims.

We claim:

1. A process for manufacturing heat-sealable packaging materials which are permeable to air, from a paper, cardboard, pasteboard, or corrugated cardboard base material consisting essentially of the steps of applying to the said base material an organic solvent solution consisting essentially of (1) from 10 percent to 50 percent by weight based upon the total solution weight of a thermoplastic material having an activation temperature for sealing purposes of between 70° C and 150° C, (2) from 10 percent to 80 percent by weight based upon the weight of solid matter in the solution of an organic low molecular weight acicularly crystallizable compound having a melting point in excess of 130° C and at least 30° C in excess of the activation temperature for sealing purposes of the thermoplastic material, (3) from 0 percent to 20 percent by weight based upon the total solution weight of auxiliary substances, and (4) from 20 percent to 85 percent by weight based upon the total solution weight of an organic solvent; evaporating the solvent from the solution at a temperature below the activation temperature to form a coating on the base material containing acicular crystals of the low molecular weight compound; and heating the coated base material to an activation temperature of 70° C to 150° C to activate the unactivated thermoplastic and to affect the sealing of the base material.

2. A heat sealable packaging material which is permeable to air comprising a base material of paper, cardboard, pasteboard or corrugated cardboard, said base material weighing from about 80 g/m² to about 500 g/m², and a coating on said base material comprising from about 5 g to 120 g of solid substance allotted per square meter of base material, said solid substance being produced from an organic solvent solution consisting essentially of (1) from 10 percent to 50 percent by weight based upon the total solution weight of a thermoplastic material having an activation temperature for sealing purposes of between 70° C and 150° C, (2) from 10 percent to 80 percent by weight based upon the weight of solid matter in the solution of an organic low molecular weight acicularly crystallizable compound selected from the group consisting of phthallic acid anhydride, hydroquinone, and the mixtures thereof, having a melting point in excess of 130° C and at least 30° C in excess of the activation temperature for sealing purposes of the thermoplastic material, (3) from 0 percent to 20 percent by weight based upon the total solution weight of auxiliary substances, and (4) from 20 percent to 85 percent by weight based upon the total solution weight of an organic solvent; by evaporating the solvent from the solution at a temperature below the activation temperature to form said coating on said base material containing acicular crystals of said low molecular weight compound, and by heating the coated base material to an activation temperature of 70° C to 150° C to activate the unactivated thermoplastic and to affect the sealing of the base material.

3. The process as claimed in claim 1, in which the acicularly crystallizable compound is completely dissolved in the organic solvent.

4. The process as claimed in claim 1, in which the low molecular weight compound is present in an amount of from 15 percent to 45 percent by weight based upon the weight of solid matter in the solution.

5. The process as claimed in claim 1, in which the low molecular weight compound is selected from the group consisting of urea, phthalic acid anhydride, hydroquinone, succinic acid and the mixtures thereof.

6. The process as claimed in claim 1, in which the organic solvent is selected from the group consisting of (a) acetone, ethyl acetate, methyl ethyl ketone, trichloroethylene, carbon tetrachloride, methylene chloride or dimethylsulphoxide, (b) a low-boiling alcohol, and (c) the mixtures thereof.

7. The process as claimed in claim 1, in which the auxiliary substance is selected from the group consisting of low molecular plasticizers, polymeric plasticizer dye, pigment, stabilizer and antioxidant.

* * * * *